United States Patent Office

2,856,300
Patented Oct. 14, 1958

2,856,300

EMULSIFIED COMPOSITION FOR LATEX PAINTS AND A PROCESS OF MAKING IT

John F. McKay, Cranford, N. J., assignor to Esso Research and Engineering Company, a corporation of Delaware No Drawing. Application August 11, 1955
Serial No. 527,873

9 Claims. (Cl. 106—285)

This invention relates to the preparation of synthetic latices from synthetic polymeric drying oils. More particularly, it relates to the preparation of an emulsifier from the polymer to be emulsified and the use of this emulsifier to emulsify the bulk of the polymer.

Synthetic drying oils can be prepared by various methods from butadiene alone or from mixtures containing butadiene together with materials copolymerizable therewith. Sodium polymerization, emulsion polymerization as well as bulk or mass polymerization in the presence of a diluent and a peroxide type catalyst have been used for this purpose with varying degeres of success. However, among the difficulties encountered with various synthetic drying oils were poor drying rate, poor flexibility and poor adhesion of air-dried coatings, poor wetting properties and consequent difficulty of grinding in pigments, poor gloss and streakiness of brushed enamel films prepared therefrom. While some of these disadvantages have been overcome in the past, the corrective measures employed usually have resulted in aggravation of other undesirable characteristics. In general the sodium catalyzed polymers have been found to be most economical to produce and to have a good drying rate but at the same time this type of drying oil was found to have particularly poor pigment wetting power and enamels prepared therefrom gave dull and very streaky films by brushing.

Most of these disadvantages can be overcome by oxidizing the oily copolymer by blowing with air or oxygen in the presence of a solvent, preferably aromatic, and preferably a catalyst such as a small amount of a metal naphthenate or other drier. These oxidized oils contain up to about 20% oxygen and have much improved pigment-wetting characteristics. However, the oxidized product generally has very poor viscosity stability, often becoming too viscous to handle even after comparatively short storage periods.

It has now been discovered that the difficulties inherent in the oxidized product can be circumvented by preparing the oxidized oil in the form of an emulsion. Such emulsions are especially useful in the formulation of emulsion or latex paints which have been found to be superior to emulsion paints prepared from non-oxidized synthetic drying oils.

The synthetic oils to which the present invention is applicable are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g., with 5 to 30% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. patent application, Ser. No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50%–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer had begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product.

Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e. g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

The blowing of the polymeric drying oils is best carried out in a solvent of moderate to good solvency, e. g., solvents or solvent mixtures having a Kauri butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low Kauri butanol value solvents are generally useful, the oil can be dissolved in strong solvent(s) from the start, thereby eliminating low solvency solvents. The choice of solvents will of course depend on the oxygen content which is desired in the finished oil as well as on the formulations of the coating compositions which are to be made from the blown oil, and in the interest of economy it is generally desirable to use the cheapest solvent(s) which possess the needed attributes of Kauri butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemi-mellitene, pseudocumene, mesitylene, propyl benzene, cymene, ethyl toluene, methyl ethyl benzene, xylenes, Solvesso 100 (a mixture of aromatic hydrocarbons boiling from about 150 to 175° C.), Solvesso 150 (a mixture of aromatic hydrocarbons boiling from about 190 to 210° C.), or mixtures thereof. Other suitable solvents include the Varsols which are straight run mineral spirits boiling in the range of 140 to 205° C., having API gravities of 40 to 55 and varying in aromatic content from 5 to 35 wt. percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more.

According to this invention, a liquid polymer oil resulting from an alkali-metal catalyzed polymerization and subsequent oxidation in the manner described is treated with an aqueous solution of a water soluble alkali such as sodium or potassium hydroxide or the corresponding carbonate or bicarbonate. This treatment can be effected readily by stirring the oxidized polymer and alkali solution together for a short time at room temperature.

Alternatively the polymer oil may be oxidized as it is received from the polymerization step before the alkali metal catalyst is removed. The oxidized oil, still containing the alkali metal, can then be mixed with water to form the alkali metal hydroxide in situ which then reacts with the oxidized oil to form the emulsifying agent.

Regardless of which of the above methods is used to prepare the emulsifying agent, the polymeric material containing the emulsifying agent now can be mixed with water in a colloid mill or other dispersing unit to form a stable oil-in-water emulsion.

The following specific example is presented to illustrate typical applications and effects of the present invention. All quantities are expressed in this specification and claims on a weight basis unless stated otherwise.

*Example I*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150 to 200° C.; solvent power, 33–37 Kauri-butanol value (reference scale: benzene—100 K. B. value, n-heptane 25.4 K. B. value).
[2] Dispersed to a particle size of 10 to 50 microns by means of an Eppenbach homomixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N. V. M. The resulting product had a viscosity of 1.5 poise at 50% N. V. M. in Varsol solution and the non-volatile portion thereof had an average molecular weight of about 3,000.

The polymer oil thus obtained was dissolved in xylene to 35% N. V. M. and blown with air at about 121° C. until the oxygen content reached 7.9% based on polymer.

An alkaline solution prepared by dissolving 3 g. KOH in 25 ml. water was dispersed in 300 g. of the above oxidized oil by rapid stirring. 700 g. water were charged to a colloid mill and the neutralized oxidized oil slowly added. An oil-in-water emulsion was produced. 30 g. of a 10% polyvinyl alcohol solution was added to stabilize the emulsion.

Most of the xylene was then stripped from the latex by vacuum steam distillation, adding additional water to the still pot as required. The product was a stable emulsion, showing a N. V. M. of 15% and a pH of 7.0. When cast on glass and air-dried, smooth continuous films of good hardness and flexibility were obtained.

*Example II*

The polymer of Example I dissolved in Solvesso 100 was blown with oxygen to an oxygen content of 10.0%.

The N. V. M. was 34.9% and the acid number was 20 (based on polymer). 1.5 g. NaOH was dissolved in 168 g. water and placed in a Premier Dispersator unit. 300 g. of the oxidized oil was added with violent stirring. A stable oil-in-water emulsion was formed which was found to produce hard continuous films on drying.

The nature of the present invention having been thus fully set forth and specific examples of the same given, what is claimed as new and useful and desired to be secured by Letters Patent is:

What is claimed is:

1. An emulsifiable composition suitable for latex paints which comprises the alkali metal salt of an oxidized copolymer of butadiene-1,3 and styrene, said copolymer having a molecular weight of about 2,000 to 5,000 and containing from about 8 to 20 wt. percent of combined oxygen.

2. An emulsifiable composition according to claim 1 in which the alkali metal is sodium.

3. Process for preparing synthetic latex suitable for latex paints which comprises treating a butadiene-1,3 and styrene copolymer oil, prepared with an alkali metal catalyst, with oxygen at a temperature of 20 to 250° C. in the presence of an aromatic solvent having a Kauri butanol value of at least 40 and a metal naphthenate until the polymer contains from about 8 to 20 wt. percent oxygen, mixing the polymer oil with water, reacting the treated polymer with an alkali metal hydroxide, stripping off the aromatic solvent and recovering a synthetic latex.

4. The process according to claim 3 in which the alkali metal catalyst is sodium.

5. Process according to claim 3 in which the alkali metal hydroxide is sodium hydroxide.

6. Process according to claim 3 in which the metal naphthenate is selected from the group consisting of cobalt, lead, iron and manganese naphthenates.

7. Process for preparing synthetic latex suitable for latex paints which comprises treating polymer oil, obtained by polymerizing 70 to 95% butadiene-1,3 and about 5 to 30 wt. percent of styrene in the presence of an alkali metal, with oxygen at a temperature of about 20 to 250° C. in the presence of an aromatic solvent having a Kauri butanol value of at least 40, the unused alkali metal and a metal naphthenate until the polymer contains from about 8 to 20 wt. percent combined oxygen, mixing the treated polymer with water, reacting the alkali metal catalyst with the water, reacting the metal hydroxide formed with the treated polymer, stripping off the aromatic solvent and recovering a synthetic latex.

8. Process according to claim 7 in which the alkali metal catalyst is sodium.

9. Process according to claim 7 in which the metal naphthenate is selected from the group consisting of cobalt, lead, iron and manganese naphthenates.

References Cited in the file of this patent

UNITED STATES PATENTS

| | | |
|---|---|---|
| 1,965,191 | Hyman | July 3, 1934 |
| 2,648,640 | Bloch | Aug. 11, 1953 |
| 2,652,342 | Gleason | Sept. 15, 1953 |
| 2,674,586 | Welsch | Apr. 6, 1954 |
| 2,708,664 | Jones | May 17, 1955 |
| 2,709,662 | Knoenecke et al. | May 31, 1955 |
| 2,728,684 | Darragh | Dec. 27, 1955 |